(12) United States Patent
Hanson et al.

(10) Patent No.: US 10,421,396 B2
(45) Date of Patent: Sep. 24, 2019

(54) SYSTEMS AND METHODS FOR SIGNALING INTENTIONS TO RIDERS

(71) Applicant: Uber Technologies, Inc., San Francisco, CA (US)

(72) Inventors: Eric James Hanson, San Francisco, CA (US); Molly Castle Nix, San Francisco, CA (US); Sean Chin, Pittsburgh, PA (US); Dennis Zhao, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/804,428

(22) Filed: Nov. 6, 2017

(65) Prior Publication Data

US 2019/0111838 A1     Apr. 18, 2019

Related U.S. Application Data

(60) Provisional application No. 62/573,761, filed on Oct. 18, 2017.

(51) Int. Cl.
*B60Q 3/80*     (2017.01)
*B60Q 3/70*     (2017.01)
(Continued)

(52) U.S. Cl.
CPC .............. *B60Q 3/80* (2017.02); *B60Q 1/50* (2013.01); *B60Q 1/52* (2013.01); *B60Q 3/70* (2017.02);
(Continued)

(58) Field of Classification Search
CPC ........................................ B60Q 3/80
(Continued)

(56) References Cited

U.S. PATENT DOCUMENTS 9,552,564 B1 * 1/2017 Martenis .............. G06Q 10/083
2008/0082261 A1 * 4/2008 Tengler ................. G01C 21/26
701/414

(Continued)

FOREIGN PATENT DOCUMENTS

KR         101764205       8/2017
WO      WO2015/179765    11/2015
WO      WO2017/117095     7/2017

OTHER PUBLICATIONS

International Search Report and Written Opinion for Application No. PCT/US2018/056028, dated Feb. 1, 2019, 11 pages.

*Primary Examiner* — Qutbuddin Ghulamali
(74) *Attorney, Agent, or Firm* — Dority & Manning, PA

(57) ABSTRACT

Systems and methods are directed to signaling status of an autonomous vehicle to a rider or potential rider. In one example, a computer-implemented method for communicating autonomous vehicle status includes obtaining, by a computing system comprising one or more computing devices, data associated with a state of an autonomous vehicle. The method further includes determining, by the computing system, one or more vehicle indications indicative of the state of the autonomous vehicle based at least in part on the data associated with the state of the autonomous vehicle. The method further includes providing, by the computing system, control data for one or more visual indicators associated with the autonomous vehicle to communicate the one or more determined vehicle indications.

20 Claims, 5 Drawing Sheets

(51) Int. Cl.
  *B60W 50/14* (2012.01)
  *B60Q 1/50* (2006.01)
  *B60Q 1/52* (2006.01)
  *B60Q 9/00* (2006.01)
  *G07C 5/00* (2006.01)
  *G08G 1/133* (2006.01)

(52) U.S. Cl.
  CPC ............... *B60Q 9/00* (2013.01); *B60W 50/14* (2013.01); *G07C 5/00* (2013.01); *G08G 1/133* (2013.01)

(58) Field of Classification Search
  USPC .......................................................... 340/438
  See application file for complete search history.

(56) References Cited

U.S. PATENT DOCUMENTS

| | | | |
|---|---|---|---|
| 2013/0253777 A1* | 9/2013 | Tengler | G01C 21/26 |
| | | | 701/45 |
| 2015/0324720 A1 | 11/2015 | Briggs et al. | |
| 2016/0009291 A1* | 1/2016 | Pallett | B60W 50/082 |
| | | | 701/23 |
| 2016/0349750 A1 | 12/2016 | Nemec et al. | |
| 2017/0193627 A1* | 7/2017 | Urmson | G01C 21/3617 |
| 2017/0228126 A1 | 8/2017 | Kim et al. | |
| 2017/0240096 A1 | 8/2017 | Ross et al. | |

\* cited by examiner

SYSTEMS AND METHODS FOR SIGNALING INTENTIONS TO RIDERS

This application claims the benefit of U.S. Provisional Application No. 62/573,761, filed Oct. 18, 2017, which is incorporated herein by reference.

FIELD

The present disclosure relates generally to autonomous vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for communicating autonomous vehicle status. The method includes obtaining, by a computing system comprising one or more computing devices, data associated with a state of an autonomous vehicle. The method further includes determining, by the computing system, one or more vehicle indications indicative of the state of the autonomous vehicle based at least in part on the data associated with the state of the autonomous vehicle. The method further includes providing, by the computing system, control data for one or more visual indicators associated with the autonomous vehicle to communicate the one or more determined vehicle indications.

Another example aspect of the present disclosure is directed to a computing system. The computing system includes one or more processors and one or more memories including instructions that, when executed by the one or more processors, cause the one or more processors to perform operations. The operations include obtaining data associated with a state of an autonomous vehicle. The operations further include determining one or more vehicle indications indicative of the state of the autonomous vehicle based at least in part on the data associated with the state of the autonomous vehicle. The operations further include providing control data for one or more visual indicators associated with the autonomous vehicle to communicate the one or more determined vehicle indications.

Another example aspect of the present disclosure is directed to an autonomous vehicle. The autonomous vehicle includes a vehicle computing system. The vehicle computing system includes one or more processors; and one or more memories including instructions that, when executed by the one or more processors, cause the one or more processors to perform operations. The operations include obtaining data associated with a state of the autonomous vehicle. The operations further include determining one or more vehicle indications indicative of the state of the autonomous vehicle based at least in part on the data associated with the state of the autonomous vehicle. The operations further include providing control data for one or more visual indicators associated with the autonomous vehicle to communicate the one or more determined vehicle indications. The operations further include controlling, by a vehicle controller, the one or more visual indicators based at least in part on the control data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
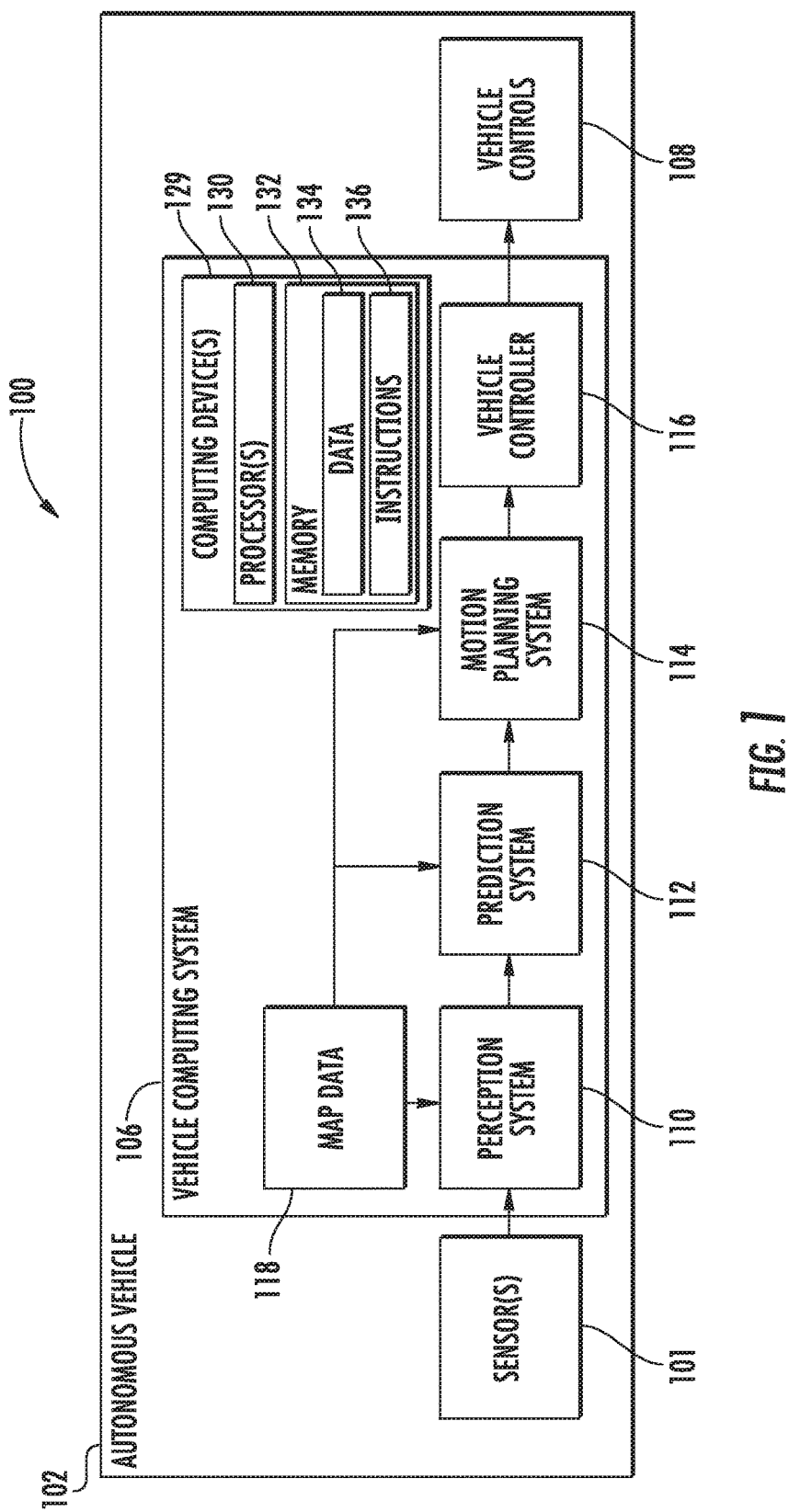
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to signaling status of an autonomous vehicle to a rider or potential rider. For instance, an autonomous vehicle can be a vehicle that can drive, navigate, operate, etc. with minimal and/or no interaction from a human operator. Autonomous vehicles can be used as part of a vehicle service that can provide one or more services such as a transportation service (e.g., rideshare service), a courier service, a delivery service, etc. When operating in a fully autonomous mode, an autonomous vehicle may not have a human operator that can provide signals to a rider regarding a status of the autonomous vehicle (e.g., the autonomous vehicle has arrived and is ready to accept riders, the autonomous vehicle is approaching the destination, etc.).

According to example aspects of the present disclosure, an autonomous vehicle can provide one or more indications (e.g., visual indicators, etc.) to allow for informing riders of the status of the autonomous vehicle. In particular, the autonomous vehicle can activate and/or adjust one or more visual indicators to provide information to riders regarding the current status of the autonomous vehicle and/or the status of the current vehicle service (e.g., trip). For instance, the autonomous vehicle can activate and/or adjust one or more visual indicators to indicate that the autonomous vehicle has arrived at a pick up location and is ready to accept riders (e.g., an arrival state), that the autonomous vehicle is ready to begin the requested trip, that the autonomous vehicle is approaching and/or at the destination of the trip, and/or the like. By way of example, the one or more visual indicators can include, for instance, illuminating, flashing, and/or pulsing one or more interior lights within the autonomous vehicle.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. The vehicle computing system can control (e.g., via a vehicle controller, etc.) one or more vehicle controls (e.g., actuators or other devices that control acceleration, throttle, steering, braking, etc.) to execute the motion plan. The vehicle computing system can further control one or more indicators such as lighting elements and/or systems, visual displays, and/or the like, onboard the autonomous vehicle to provide for alerting riders to vehicle and/or trip status. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

According to an example aspect of the present disclosure, the vehicle computing system can be configured to identify a status of the autonomous vehicle that should be communicated to a rider or potential rider. For example, the vehicle computing system can obtain data associated with the state of the autonomous vehicle and/or data associated with a vehicle service (e.g., trip) to be provided by the autonomous vehicle. The vehicle computing system can determine whether a status indication should be communicated to a rider or potential rider via one or more indicators associated with the autonomous vehicle based in part on the obtained data. The vehicle computing system can then activate and/or adjust the one or more indicators, for example, via a vehicle controller and/or the like, to communicate the vehicle status and/or trip status to the rider.

In some implementations, an autonomous vehicle can include one or more visual indicators that can be controlled to communicate status indications to riders. For example, visual indicators can include vehicle cabin lighting, one or more indicator lights and/or panels (e.g., LED lights, etc.), one or more display panels, and/or the like. In some implementations, the visual indicators can be operated in a variety of manners to provide different vehicle state and/or trip status indications. For example, one or more visual indicators, such as cabin lighting, can be turned on at varying brightness levels and/or can be flashed or pulsed at various rates (e.g., fast, slow, varied pattern, etc.) to communicate different vehicle/trip status indications. In another example, one or more visual indicators (e.g., LED lights, etc.) may provide for changing colors to communicate different vehicle/trip status indications.

In some implementations, an autonomous vehicle may use one or more visual indicators on board the vehicle to allow a rider to easily identify that the autonomous vehicle has arrived in response to a rider's vehicle service request and/or that the autonomous vehicle is available (e.g., in an arrival state). For example, in some implementations, upon arriving at a designated pick up location, the autonomous vehicle may cause one or more visual indicators to be flashed or pulsed (e.g., at a defined rate and/or in a defined pattern) to communicate to a rider that the vehicle has arrived and is waiting. In some implementations, the autonomous vehicle may activate one or more visual indicators, such as cabin lighting, for example, to indicate to the rider that the vehicle has been unlocked and the rider may enter the vehicle. In some implementations, the autonomous vehicle may cause one or more visual indicators (e.g., cabin lighting, LED indicators, etc.) to be activated and/or adjusted (e.g., flashed/pulsed, varying brightness, change color, etc.) to indicate that the vehicle is ready to begin the trip (e.g., once the rider has entered the vehicle and the doors have been secured).

In some implementations, an autonomous vehicle may use one or more visual indicators on board the vehicle to communicate destination information to the rider (e.g., a destination state). For example, in some implementations, the autonomous vehicle can cause one or more visual indicators to be activated and/or adjusted to communicate to the rider that the vehicle is approaching the trip destination (e.g., will arrive within a few minutes, etc.) and/or that the vehicle has arrived at the trip destination. In some implementations, the autonomous vehicle can cause one or more visual indicators to be activated and/or adjusted to communicate to the rider that the vehicle service is complete and/or that the doors are unlocked for the rider to exit the vehicle.

In some implementations, an autonomous vehicle may use one or more visual indicators on board the vehicle to communicate vehicle and/or trip status during a trip, such as alerting the rider to conditions that may be of interest or concern to the rider. For example, in some implementations, the autonomous vehicle can cause one or more visual indicators to be activated and/or adjusted to communicate to the rider that conditions (e.g., traffic conditions, constructions, vehicle condition, etc.) may necessitate changing the trip route and/or making an emergency stop. In some implementations, the autonomous vehicle can cause one or more visual indicators to be activated and/or adjusted to gain the riders attention, for example, when the rider needs to confirm information and/or the rider has not responded.

In some implementations, the autonomous vehicle can modify the indications or provide alternate indications, for example, based on the time of day and/or environment. For instance, in some implementations, the autonomous vehicle may use higher brightness levels or different color indicators during the day as opposed to those used at night, such that the indicators may be more readily apparent to a rider.

In some implementations, the vehicle computing system can access a data structure that defines one or more vehicle indications that can be utilized to inform riders regarding the vehicle and/or trip status. Such a data structure can be stored, for example, in memory onboard the autonomous vehicle. The data structure can include rules, tables, lists, trees, and/or another type of data structure that can indicate one or more indications that can be provided for a particular vehicle/trip status. For instance, the data structure can indicate that one or more indicators should be activated and or adjusted based on a set of parameters for a particular vehicle status. By way of example, the data structure can indicate that upon arriving at a rider's pick up location, the autonomous vehicle should activate the interior lights and pulse the interior lights at a defined rate.

The systems and methods described herein may provide a number of technical effects and benefits. For instance, the systems and methods of the present disclosure can enable a vehicle computing system to easily and efficiently communicate vehicle status and/or changing conditions to riders. The improved indications can better inform riders regarding the operation of the autonomous vehicle before and during a vehicle service and improve a rider's perception of the autonomous vehicle service.

The systems and methods described herein may also provide a technical effect and benefit of providing a more seamless experience for a rider using an autonomous vehicle. For instance, the use of visual indications in an autonomous vehicle in accordance with the present disclosure can provide for mitigating the gap between the actions of a human driver and an autonomous vehicle, improving the autonomous vehicle-rider experience. By communicating the current state/status of the vehicle and/or trip to the rider without requiring any action by the rider, can improve the rider's awareness during the trip as well as improve the rider's comfort level with the autonomous vehicle.

The systems and methods described herein may also provide resulting improvements to computing technology tasked with operations of an autonomous vehicle. For instance, the computer-implemented methods and systems described herein can improve the ability of the vehicle computing technology to communicate vehicle status to riders and/or potential riders. For example, through the use of visual indicators onboard the autonomous vehicle, a vehicle computing system may be able to optimize processing power and efficiency by using onboard systems to quickly and easily communicate vehicle status to a rider rather than relaying communications to a rider (e.g., via an application on a rider's computing device) through remote systems, such as an operations computing system and/or the like.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode, semi-autonomous operational mode, and/or a non-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path. Additionally, in some implementations, the vehicle computing system 106 can obtain rider profile data including one or more user preferences/settings (e.g., from a remote computing system) and apply the one or more user preference/settings in determining whether a rider's trip request can be assigned to an autonomous vehicle.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
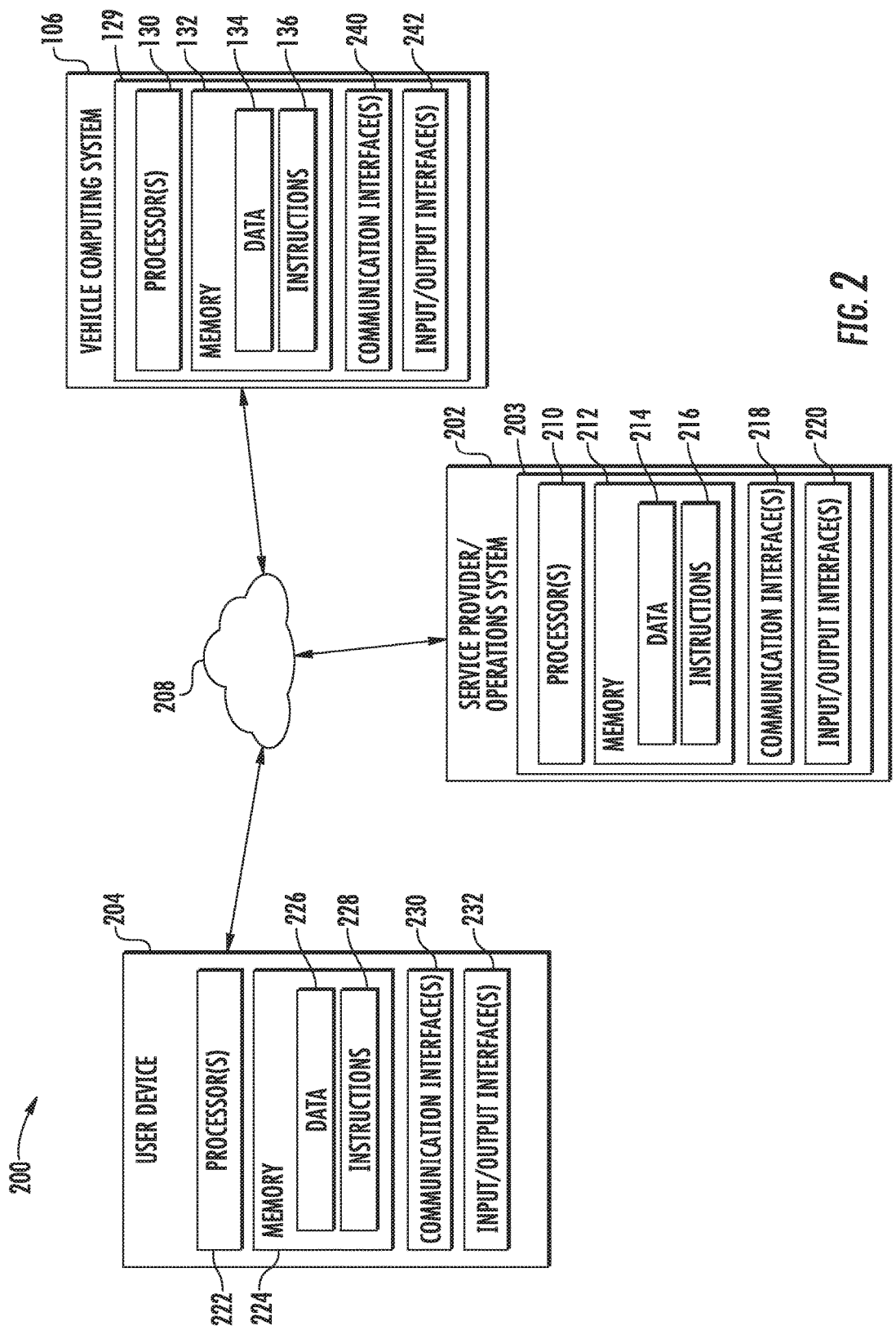
FIG. 2 depicts a block diagram of an example system according to example embodiments of the present disclosure.

FIG. 2 depicts a block diagram of an example system 200 according to example embodiments of the present disclosure. The example system 200 illustrated in FIG. 2 is provided as an example only. The components, systems, connections, and/or other aspects illustrated in FIG. 2 are optional and are provided as examples of what is possible, but not required, to implement the present disclosure. FIG. 2 illustrates an example system 200 including a service provider/operations system 202, vehicle computing system(s) 106, and user device(s) 204 that can be communicatively coupled to one another over one or more network(s) 208 and can provide one or more operations in accordance with example embodiments of the systems and methods of the present disclosure.

As illustrated, the system 200 can include a service provider/operations system 202 which can provide services for monitoring, communicating with, managing, etc. a fleet of vehicles. The service provider/operations system 202 can also provide services for an application platform, such as a ride sharing application, delivery service application, courier service application, and/or other service application, for example, maintained by a service provider. For example, the service provider/operations system 202 can communicate with one or more user devices 204 to provide user access to an application platform. The service provider/operations system 202 can also communicate with one or more vehicle computing systems 106 (e.g., onboard vehicles within a fleet) to provision services associated with an application platform, such as a ride sharing platform, delivery service platform, courier service platform, and/or other service platform. The service provider/operations system 202 can be associated with a central operations system and/or an entity associated with an autonomous vehicle and/or application platform such as, for example, a vehicle owner, vehicle manager, fleet operator, service provider, etc.

More particularly, the service provider/operations system 202 can include one or more computing device(s) 203 to perform operations associated with operating a fleet of vehicles and/or an application platform. The computing device(s) 203 can include one or more processor(s) 210 and at least one memory 212. The one or more processors 210 can be any suitable processing device (e.g., a processor core, a microprocessor, an ASIC, a FPGA, a controller, a microcontroller, etc.) and can be one processor or a plurality of processors that are operatively connected. The memory 212 can include one or more non-transitory computer-readable storage mediums, such as RAM, ROM, EEPROM, EPROM, flash memory devices, magnetic disks, etc., and combinations thereof.

The memory 212 can store data 214 and computer-readable instructions 216 which are executed by the processor 210 to cause the computing device(s) 203 to perform operations such as those described herein. The instructions 216 can be software written in any suitable programming language or can be implemented in hardware. Additionally, or alternatively, the instructions 216 can be executed in logically and/or virtually separate threads on processor(s) 210. For example, the memory 212 can store instructions 216 that when executed by the one or more processors 210 cause the one or more processors 210 to perform any of the operations and/or functions described herein, including, for example, one or more operations of FIG. 5. Additionally, in some implementations, the memory 212 can store data 214 which can include data such as described herein and the service provider/operations system 202 can provide at least some portion of the data to one or more remote computing systems, such as a vehicle computing system in an autonomous vehicle (e.g., vehicle computing system 106 of FIG. 1) and/or user device 204, for example.

In some implementations, the one or more processors 210 and at least one memory 212 may be comprised in one or more computing devices within service provider/operations system 202. In some implementations, the service provider/operations system 202 can obtain data from one or more memory device(s) that are remote from the service provider/operations system 202.

The one or more computing device(s) 203 included in service provider/operations system 202 can also include one or more input/output interface(s) 220 that can be used to receive input, such as from a user, and provide output, such as for display or playback to a user. The input/output interface(s) 220 can include, for example, devices for receiving information from or providing information to a user, such as a display device, touch screen, touch pad, mouse, data entry keys, an audio output device such as one or more speakers, a microphone, haptic feedback device, etc. The input/output interface(s) 220 can be used, for example, by a user to control operation of the computing device(s) 203 included in service provider/operations system 202.

The computing device(s) 203 can also include one or more communication interface(s) 218 used to communicate with one or more systems or devices, including systems or devices that are remotely located from the computing device(s) 203, such as a user device 204, a vehicle computing system 106, and/or the like, for example. The communication interface(s) 218 can include any circuits, components, software, etc. for communicating with one or more networks (e.g., network 208). In some implementations, the communication interface(s) 218 can include, for example, one or more of a communications controller, receiver, transceiver, transmitter, port, conductors, software, and/or hardware for communicating data.

In some implementations, the service provider/operations system 202 can include one or more server computing devices. If the service provider/operations system 202 includes multiple server computing devices, such server computing devices can operate according to various computing architectures, including, for example, sequential computing architectures, parallel computing architectures, or some combination thereof.

The network(s) 208 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 208 can be accomplished, for instance, via a communication interface using any type of protocol, protection scheme, encoding, format, packaging, etc.

As further illustrated, the system 200 can include a vehicle computing system 106 (e.g., included in an autonomous vehicle such as autonomous vehicle 102 of FIG. 1) which can provide operations for controlling an autonomous vehicle. In some implementations, the vehicle computing system 106 can perform autonomous vehicle motion planning and enable operation of an autonomous vehicle, as described herein.

More particularly, the vehicle computing system 106 can include one or more computing device(s) 129 to perform operations associated with an autonomous vehicle. The computing device(s) 129 can include one or more processor(s) 130 and at least one memory 132. The one or more processor(s) 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof.

The memory 132 can store data 134 and computer-readable instructions 136 which are executed by the processor(s) 130 to cause the computing device(s) 129 to perform operations such as described herein, including providing for operation of an autonomous vehicle to provide a requested service to a rider, for example. The instructions 136 can be software written in any suitable programming language or can be implemented in hardware. Additionally, or alternatively, the instructions 136 can be executed in logically and/or virtually separate threads on processor(s) 130. For example, the memory 132 can store instructions 136 that when executed by the one or more processor(s) 130 cause the one or more processor(s) 130 to perform any of the operations and/or functions described herein, including, for example, one or more operations of FIG. 5.

In some implementations, the one or more processor(s) 130 and at least one memory 132 may be comprised in one or more computing devices within the vehicle computing system 106. In some implementations, the vehicle computing system 106 can obtain data from one or more memory device(s) that are remote from the vehicle computing system 106.

The one or more computing device(s) 129 included in vehicle computing system 106 can also include one or more input/output interface(s) 242 that can be used to receive input, such as from a user, and provide output, such as for display or playback to a user. The input/output interface(s) 242 can include, for example, devices for receiving information from or providing information to a user, such as a display device, touch screen, touch pad, mouse, data entry keys, an audio output device such as one or more speakers, a microphone, haptic feedback device, etc. The input/output interface(s) 242 can be used, for example, by a user to control operation of the computing device(s) 129 included in vehicle computing system 106.

The computing device(s) 129 can also include one or more communication interface(s) 240 used to communicate with one or more systems or devices, including systems and devices on-board an autonomous vehicle as well as systems or devices that are remotely located from the computing device(s) 129 and/or the autonomous vehicle, such as service provider/operations system 202, user device 204, and/or the like, for example. The communication interface(s) 240 can include any circuits, components, software, etc. for communicating with one or more networks (e.g., network 208). In some implementations, the communication interface(s) 240 can include, for example, one or more of a communications controller, receiver, transceiver, transmitter, port, conductors, software, and/or hardware for communicating data.

As further illustrated, a user device 204 may provide a user with access to an application platform, such as a ride sharing platform, maintained by a service provider and allow the user to establish/maintain a user account for the application platform, and/or request services associated with the application platform. The user device 204 can be any type of computing device, such as, for example, a personal computing device (e.g., laptop, desktop, etc.), a mobile computing device (e.g., smartphone, tablet, etc.), a gaming console or controller, a wearable computing device, an embedded computing device, a personal assistant computing device, or any other type of computing device.

More particularly, the user device 204 can include one or more processor(s) 222 and at least one memory 224. The one or more processors 222 can be any suitable processing device (e.g., a processor core, a microprocessor, an ASIC, a FPGA, a controller, a microcontroller, etc.) and can be one processor or a plurality of processors that are operatively connected. The memory 224 can include one or more non-transitory computer-readable storage mediums, such as RAM, ROM, EEPROM, EPROM, flash memory devices, magnetic disks, etc., and combinations thereof. The memory 224 can store data 226 and computer-readable instructions 228 which are executed by the processor 222 to cause the user device 204 to perform operations, such as those described herein. The instructions 228 can be software written in any suitable programming language or can be implemented in hardware. Additionally, or alternatively, the instructions 228 can be executed in logically and/or virtually separate threads on processor(s) 222.

In some implementations, the one or more processors 222 and at least one memory 224 may be comprised in one or more computing devices within the user device 204. In some implementations, the user device 204 can obtain data from one or more memory device(s) that are remote from the user device 204.

The user device 204 can also include one or more input/output interface(s) 232 that can be used to receive input, such as from a user, and provide output, such as for display and/or playback to a user. The input/output interface(s) 232 can include, for example, devices for receiving information from or providing information to a user, such as a display device, touch screen, touch pad, mouse, data entry keys, an audio output device such as one or more speakers, a microphone, haptic feedback device, etc. The input/output interface(s) 232 can be used, for example, by a user to control operation of the user device 204.

The user device 204 can also include one or more communication interface(s) 230 used to communicate with one or more systems or devices, including systems or devices that are remotely located from the user device 204, such as service provider/operations system 202 and/or the like, for example. The communication interface(s) 230 can include any circuits, components, software, etc. for communicating with one or more networks (e.g., network 208). In some implementations, the communication interface(s) 230 can include, for example, one or more of a communications controller, receiver, transceiver, transmitter, port, conductors, software, and/or hardware for communicating data.

Figure 3:
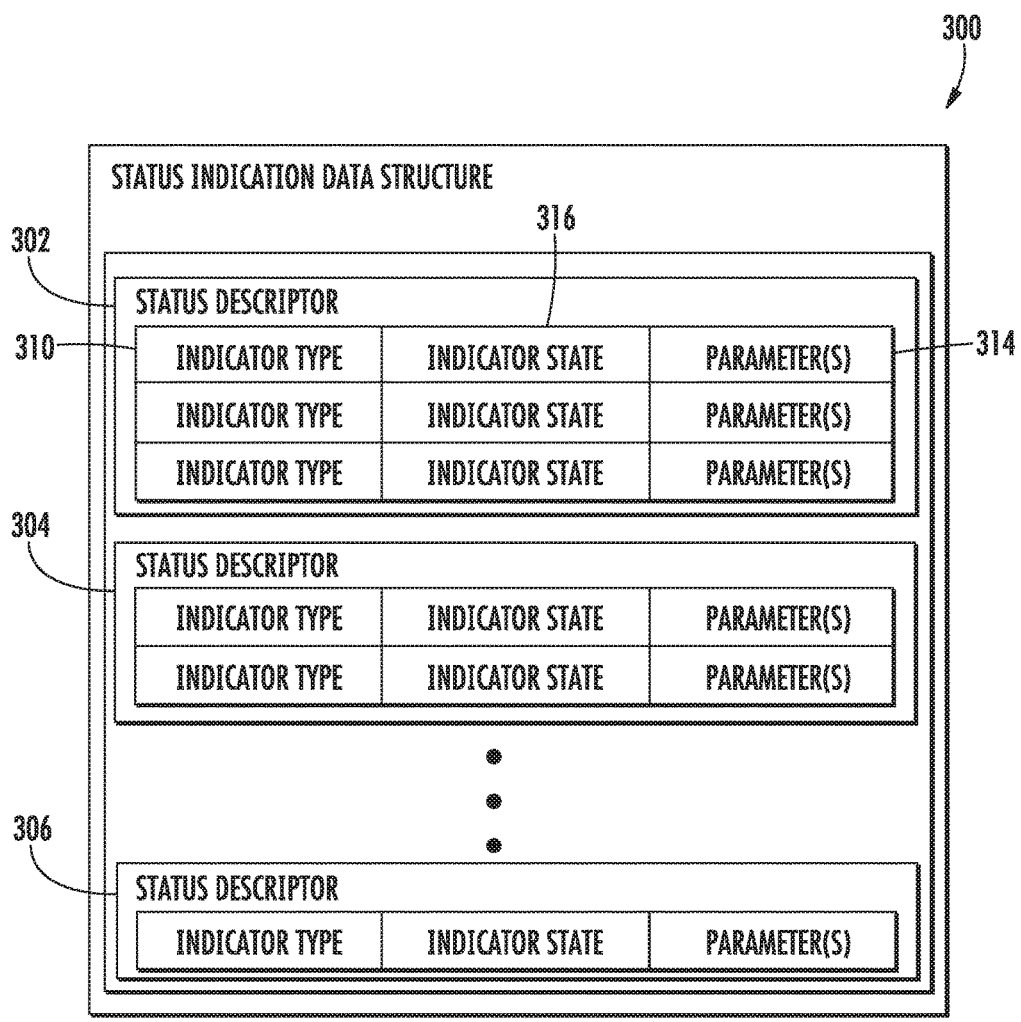
FIG. 3 depicts a block diagram of an example data structure according to example embodiments of the present disclosure.

FIG. 3 depicts a block diagram of an example data structure 300 according to example embodiments of the present disclosure. In some implementations, a vehicle computing system can access a data structure, such as status indication data structure 300, that defines one or more vehicle indications which can be utilized to inform riders regarding the vehicle and/or trip status. For instance, the data structure 300 can indicate that one or more indicators should be activated and or adjusted based on a set of parameters for a particular vehicle status, such as an arrival status, an unlocked status, a trip ready status, a destination status, and/or the like.

A status indication data structure 300 can include records for one or more status descriptors, such as a status descriptor 302, 304, or 306, which can define one or more indications that can be provided to inform a rider of a particular vehicle/trip status. A status descriptor, such as status descriptor 302, can define what indicators can be activated and/or adjusted to inform a rider of a vehicle/trip status, such as an arrival status (e.g., that the vehicle has arrived at the pickup location and is ready for the rider).

The status descriptor 302 can include an indicator type 310 which can define the type of indicator that can be activated and/or adjusted to inform the rider of the status, such as cabin lighting, for example. The status descriptor 302 can further include an indicator state 316 which can define how the indicator should be controlled to indicate the status, such as flashed/pulsed, varying brightness, change color, and/or the like. The status descriptor 302 can further include one or more parameters 314 that can indicate how the indicator can be operated and/or adjusted to provide the status indication. For example, the one or more parameters 314 can indicate a pattern that should be used, a color that should be used, and/or the like. The parameter(s) 314 can also indicate how the status indictor can be changed based on environment, context, and/or time of day. For instance, in some implementations, the parameters 314 can indicate that the indicator should be operated at higher brightness levels or different color indicators should be used during the day as opposed to those used at night, such that the indicators may be more readily apparent to a rider.

Figure 4:
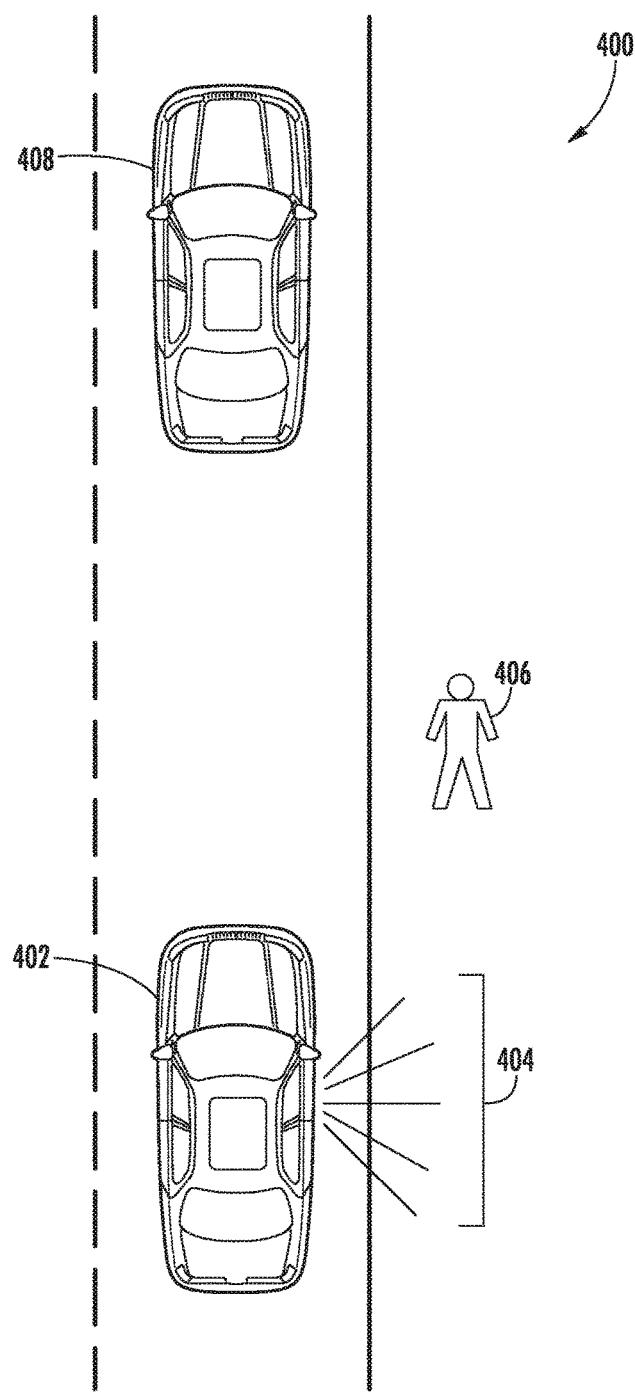
FIG. 4 depicts a block diagram of an example autonomous vehicle visual indicator according to example embodiments of the present disclosure.

FIG. 4 depicts a block diagram of an example autonomous vehicle visual indicator scenario 400 according to example embodiments of the present disclosure. In particular, FIG. 4 illustrates an example of arrival status indication. As illustrated in FIG. 4, a rider 406 may be waiting for an autonomous vehicle to arrive at a designated pickup location, for example, in response to a request sent by the rider 406. At the pickup location, the rider 406 may see that two vehicles, vehicle 402 and vehicle 408, have arrived. The rider may be unsure which vehicle is assigned to provide the requested service, and as such is looking for an expected indication from the assigned vehicle. Upon arriving at the pickup location, the assigned vehicle 402 may activate one or more indicators (e.g., cabin lighting, LEDs, etc.) to provide an indication 404 to the rider. For example, vehicle 402 may activate and flash one or more lights to provide an indication 404 that the vehicle has arrived and is ready for the rider. Thus, rider 406 can identify the vehicle assigned to provide their service upon seeing the indication 404 provided by vehicle 402 and access vehicle 402 to begin their service.

Figure 5:
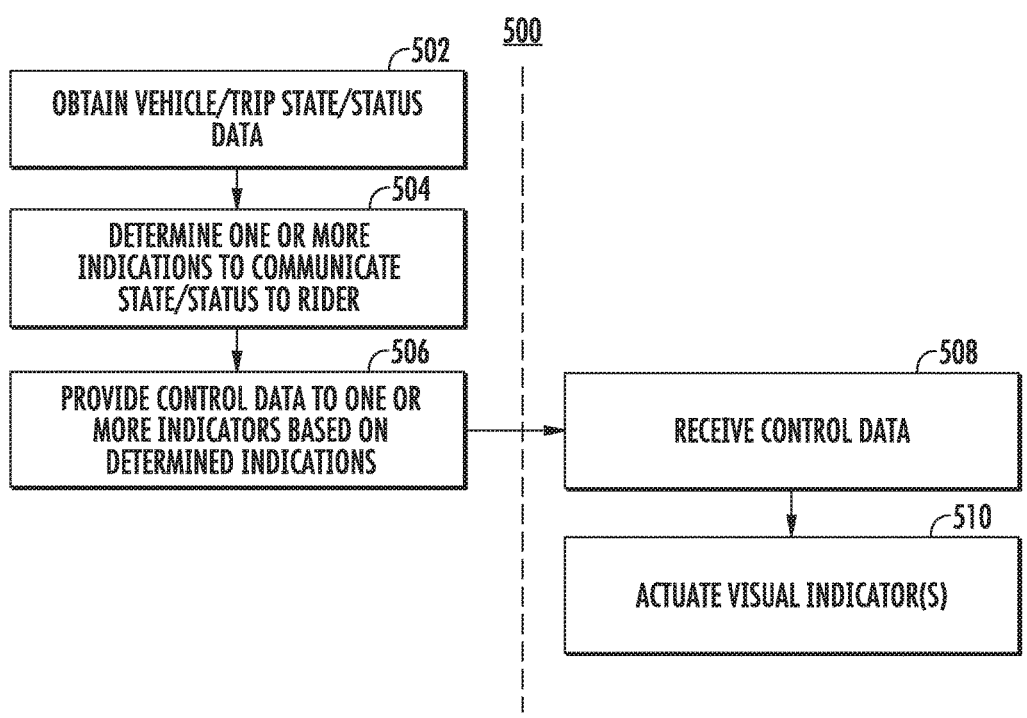
FIG. 5 depicts a flowchart diagram of example operations for communicating vehicle status to a rider according to example embodiments of the present disclosure.

FIG. 5 depicts a flowchart diagram of example operations 500 for communicating vehicle status to a rider according to example embodiments of the present disclosure. One or more portion(s) of the operations 500 can be implemented by one or more computing devices such as, for example, an operations computing system 204 of FIG. 2, the vehicle computing system 106 of FIG. 1, and/or the like. Moreover, one or more portion(s) of the operations 500 can be implemented as an algorithm on the hardware components of the device(s) described herein (e.g., as in FIGS. 1 and 2) to, for example, provide for signaling status of an autonomous vehicle to a rider or potential rider.

At 502, one or more computing devices included within a computing system (e.g., an operations computing system 204, and/or the like) can obtain vehicle state and/or trip status data associated with an autonomous vehicle provisioned to provide a service to a rider (e.g., the autonomous vehicle has arrived and is ready to accept riders, the autonomous vehicle is approaching the destination, etc.).

At 504, the computing system can determine one or more indications that should be provided to communicate the vehicle state and/or trip status to a rider. For example, the computing system can determine that one or more visual indicators (e.g., cabin lighting, LED indicators, other vehicle lights, etc.) should be activated and/or adjusted to provide information to riders regarding the current state of the autonomous vehicle and/or the status of the current vehicle trip.

At 506, the computing system can provide control data to one or more indicators based on the determined indications for the vehicle state/trip status. For example, the control data can indicate that one or more indicators should be activated, be flashed, be pulsed, change color, change brightness, and/or the like.

At 508, the indicator control data can be received by the determined visual indicators onboard the autonomous vehicle. At 510, the one or more visual indicators can be activated and/or adjusted based on the control data and provide for communicating the vehicle state/trip status to the rider.

Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for communicating autonomous vehicle status comprising:

obtaining, by a computing system comprising one or more computing devices, data associated with a state of an autonomous vehicle;

determining, by the computing system, one or more vehicle indications indicative of the state of the autonomous vehicle provided by the autonomous vehicle relative to a service provided by the autonomous vehicle based at least in part on the data associated with the state of the autonomous vehicle; and providing, by the computing system, control data for one or more visual display indicators associated with the autonomous vehicle to communicate the one or more determined vehicle indications to one or more riders in association with the service provided by the autonomous vehicle.

2. The computer-implemented method of claim 1, wherein the one or more vehicle indications indicative of the state of the autonomous vehicle comprise one or more of:

activating one or more vehicle lighting elements;

increasing a brightness level of one or more the vehicle lighting elements;

flashing one or more of the vehicle lighting elements at a defined rate; and adjusting a color of one or more of the vehicle lighting elements.

3. The computer-implemented method of claim 1, wherein the one or more visual indicators comprise interior lighting elements of the autonomous vehicle.

4. The computer-implemented method of claim 3, wherein the one or more vehicle indications indicative of the state of the autonomous vehicle comprise one or more of:

increasing a brightness level of one or more of the interior lighting elements;

flashing one or more of the interior lighting elements at a defined rate; and adjusting a color of one or more of the interior lighting elements.

5. The computer-implemented method of claim 1, wherein the data associated with the state of the autonomous vehicle comprises arrival state data.

6. The computer-implemented method of claim 5, wherein the arrival state data comprises one or more of:

a vehicle available status;

a vehicle unlocked status; and a service confirmed status.

7. The computer-implemented method of claim 1, wherein the data associated with the state of the autonomous vehicle comprises destination state data.

8. The computer-implemented method of claim 7, wherein the destination state data comprises one or more of:

an approaching destination status;

an arrived status; and a service complete status.

9. The computer-implemented method of claim 1, wherein the data associated with the state of the autonomous vehicle comprises vehicle service status data.

10. The computer-implemented method of claim 9, wherein the vehicle service status data comprises one or more of:

route change condition data;

emergency condition data; and rider alert data.

11. A computing system comprising:

one or more processors; and one or more memories including instructions that, when executed by the one or more processors, cause the one or more processors to perform operations, the operations comprising:

obtaining data associated with a state of an autonomous vehicle;

determining one or more vehicle indications indicative of the state of the autonomous vehicle provided by the autonomous vehicle relative to a service provided by the autonomous vehicle based at least in part on the data associated with the state of the autonomous vehicle; and providing control data for one or more visual display indicators associated with the autonomous vehicle to communicate the one or more determined vehicle indications in association with the service provided by the autonomous vehicle.

12. The computing system of claim 11, wherein the one or more vehicle indications indicative of the state of the autonomous vehicle comprise one or more of:

activating one or more vehicle lighting elements;

increasing a brightness level of one or more of the vehicle lighting elements;

flashing one or more of the vehicle lighting elements at a defined rate; and adjusting a color of one or more of the vehicle lighting elements.

13. The computing system of claim 11, wherein the one or more visual indicators comprise interior lighting elements of the autonomous vehicle.

14. The computing system of claim 11, wherein the data associated with the state of the autonomous vehicle comprises arrival state data, wherein the arrival state data comprises one or more of:

a vehicle available status;

a vehicle unlocked status; and a service confirmed status.

15. The computing system of claim 11, wherein the data associated with the state of the autonomous vehicle comprises destination state data, wherein the destination state data comprises one or more of:

an approaching destination status;

an arrived status; and a service complete status.

16. The computing system of claim 11, wherein the data associated with the state of the autonomous vehicle comprises vehicle service status data, and wherein the vehicle service status data comprises one or more of:

route change condition data;

emergency condition data; and rider alert data.

17. An autonomous vehicle comprising:

a vehicle computing system, the vehicle computing system comprising:

one or more processors; and memory storing instructions that, when executed by the one or more processors, cause the one or more processors to perform operations, the operations comprising:

obtaining data associated with a state of the autonomous vehicle;

determining one or more vehicle indications indicative of the state of the autonomous vehicle provided by the autonomous vehicle relative to a service provided by the autonomous vehicle based at least in part on the data associated with the state of the autonomous vehicle;

providing control data for one or more visual display indicators associated with the autonomous vehicle to communicate the one or more determined vehicle indications; and controlling, by a vehicle controller, the one or more visual indicators based at least in part on the control data in association with the service provided by the autonomous vehicle.

18. The autonomous vehicle of claim 17, wherein the one or more vehicle indications indicative of the state of the autonomous vehicle comprise one or more of:

activating one or more vehicle lighting elements;

increasing a brightness level of one or more of the vehicle lighting elements;

flashing one or more of the vehicle lighting elements at a defined rate; and adjusting a color of one or more of the vehicle lighting elements.

19. The autonomous vehicle of claim 17, wherein the one or more visual indicators comprise interior lighting elements of the autonomous vehicle.

20. The autonomous vehicle of claim 17, wherein the data associated with the state of the autonomous vehicle comprises one or more of:

arrival state data;

destination state data; and vehicle service status data.

\* \* \* \* \*